US00RE44109E

(19) United States
(12) Reissued Patent
Choi et al.

(10) Patent Number: US RE44,109 E
(45) Date of Reissued Patent: Mar. 26, 2013

(54) METHOD FOR EFFECTIVELY TRANSMITTING SYNCHRONIZATION CHANNEL AND METHOD FOR ALLOCATING TRANSMISSION POWER FOR THE SAME

(75) Inventors: Sung Duk Choi, Anyang-si (KR); Young Woo Yun, Anyang-si (KR); Ki Jun Kim, Anyang-si (KR); Hak Seong Kim, Anyang-si (KR); Suk Hyon Yoon, Anyang-si (KR); Joon Kui Ahn, Anyang-si (KR)

(73) Assignee: LG Electronics Inc., Seoul (KR)

(21) Appl. No.: 13/472,312

(22) Filed: May 15, 2012

Related U.S. Patent Documents

Reissue of:
(64) Patent No.: 8,050,704
Issued: Nov. 1, 2011
Appl. No.: 12/444,117
PCT Filed: Oct. 2, 2007
PCT No.: PCT/KR2007/004826
§ 371 (c)(1),
(2), (4) Date: Apr. 2, 2009
PCT Pub. No.: WO2008/041821
PCT Pub. Date: Apr. 10, 2008

U.S. Applications:
(60) Provisional application No. 60/827,854, filed on Oct. 2, 2006.

(30) Foreign Application Priority Data

Jan. 31, 2007 (KR) ..... 10-2007-0009919

(51) Int. Cl.
*H04B 7/00* (2006.01)

(52) U.S. Cl. ..... 455/522; 455/13.4; 455/127.1; 455/69; 455/453; 370/252; 370/320; 370/330; 370/335; 375/130; 375/141; 375/148; 375/335

(58) Field of Classification Search ..... 455/15, 455/453, 69, 70, 522, 127.1, 13.4; 370/130, 370/252, 320, 311, 330, 335; 375/130, 141, 375/148, 335
See application file for complete search history.

(56) References Cited

U.S. PATENT DOCUMENTS

| | | | | |
|---|---|---|---|---|
| 6,810,253 | B2 * | 10/2004 | Lee et al. | 455/436 |
| 6,904,291 | B2 * | 6/2005 | Miyamoto et al. | 455/522 |
| 7,349,714 | B2 * | 3/2008 | Lee et al. | 455/522 |
| 7,804,814 | B2 * | 9/2010 | Ali-Hackl et al. | 370/350 |
| 2005/0117549 | A1 * | 6/2005 | Kanterakis et al. | 370/335 |
| 2008/0019350 | A1 * | 1/2008 | Onggosanusi et al. | 370/350 |
| 2009/0131094 | A1 * | 5/2009 | Natsume | 455/522 |
| 2010/0041430 | A1 * | 2/2010 | Ishii et al. | 455/522 |
| 2010/0220606 | A1 * | 9/2010 | Niwano | 370/252 |

(Continued)

FOREIGN PATENT DOCUMENTS

| | | |
|---|---|---|
| WO | 2004/112277 | 12/2004 |
| WO | 2004/112277 A1 | 12/2004 |

OTHER PUBLICATIONS

S. Lee et al., "Air-link performance of the cdma2000 based mobile wireless network", IEEE Global Telecommunications Conference, vol. 6, Nov. 2001.

Sungwon Lee et al., 'Air-link performance of the cdma2000 based mobile wireless network', 2001 IEEE Global Telecommunications conference, San Antonio, TX, USA; Nov. 25, 2001; XP 010746404; ISBN 978-0-7803-7206-1.

*Primary Examiner* — Linh Nguyen
(74) *Attorney, Agent, or Firm* — Lee, Hong, Degerman, Kang & Waimey

(57) ABSTRACT

A method for effectively allocating a transmission power and a method for transmitting SCH are disclosed. In this case, the transmission power of the SCH, which is important for initial cell search of the user equipment, is increased but is not allocated to a predetermined frequency region within one OFDM symbol to obtain the increased transmission power, thereby minimizing an influence on transmission of other channels within one OFDM symbol.

9 Claims, 7 Drawing Sheets

U.S. PATENT DOCUMENTS

2010/0291925 A1* 11/2010 Nagata et al. ..... 455/434

2011/0026419 A1* 2/2011 Kim et al. ..... 370/252

* cited by examiner

METHOD FOR EFFECTIVELY TRANSMITTING SYNCHRONIZATION CHANNEL AND METHOD FOR ALLOCATING TRANSMISSION POWER FOR THE SAME

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a reissue of U.S. Pat. No. 8,050,704, which issued on Nov. 1, 2011, from U.S. application Ser. No. 12/444,117, filed on Apr. 2, 2009, which is the National Stage filing under 35 U.S.C. 371 of International Application No. PCT/KR2007/004826, filed on Oct. 2, 2007, which claims the benefit of earlier filing date and right of priority to Korean Application No. 10-2007-0009919, filed on Jan. 31, 2007, and also claims the benefit of U.S. Provisional Application Ser. No. 60/827,854, filed on Oct. 2, 2006.*

TECHNICAL FIELD

The present invention relates to a synchronization channel (SCH) in a multiple carrier mobile communication system, and more particularly, to a method for effectively transmitting a synchronization channel (SCH) and a method for allocating a transmission power for the same.

BACKGROUND ART

First of all, a general synchronization channel (SCH) will be described.

In a multiple carrier mobile communication system, for example, an orthogonal frequency division multiple (OFDM) communication system, a user equipment (UE) receives a synchronization channel (SCH) to initially access a base station. In this case, the user equipment can acquire timing synchronization and frequency synchronization of a signal transmitted from the base station. Afterwards, the user equipment sets up communication with the base station by acquiring cell information and/or system information through a broadcasting channel (BCH) and a reference symbol, if necessary, as well as the aforementioned synchronization channel.

Meanwhile, the aforementioned synchronization channel (SCH) can be classified into a primary synchronization channel P_SCH and a secondary synchronization channel S_SCH depending on its function. For example, since a code sequence of the primary synchronization channel P_SCH is used equally in every cell, the user equipment can perform timing detection and frequency correction of a signal transmitted from a specific cell even in case that the user equipment does not know a cell to which the user equipment belongs. A code sequence of the secondary synchronization channel S_SCH depends on information (for example, cell ID, CP length, etc.) of a cell to allow the user equipment to obtain information of either a cell to which the user equipment is connected or a neighboring cell after acquiring timing.

FIG. 1 is a flow chart illustrating a method for performing initial cell search by using a synchronization channel (SCH).

First of all, in steps S101 and S102, the user equipment starts and acquires initial OFDM symbol timing and frequency synchronization by using the SCH. Then, in step S103, the user equipment acquires frame synchronization by using the acquired timing and frequency synchronization. At the same time, in step S104, the user equipment acquires cell related information such as cell ID, and completes an initial procedure for access to the base station in step S105.

As described above, the synchronization channel (SCH) which is important for initial cell search of the user equipment should be received regardless of a system band of a cell which the user equipment wishes to access even in case that several system bands exist within one system (i.e., in case where a scalable bandwidth is supported). For example, in a 3GPP LTE system which is currently being discussed, several system bandwidths of 10 Mhz, 5 Mhz and 1.25 Mhz can exist within one system.

FIG. 2 illustrates a bandwidth where the SCH is located in a scalable bandwidth.

Specifically, FIG. 2 illustrates a method for positioning the SCH in a frequency band in case where three transmission bandwidths of 10 Mhz, 5 Mhz and 1.25 Mhz exist within one system as described above. As shown in FIG. 2, the current 3GPP LTE system is based on that the SCH is allocated to the smallest bandwidth of 1.25 Mhz among bandwidths of 10 Mhz, 5 Mhz and 1.25 Mhz which the system can support, so that the user equipment can receive the SCH no matter what the user equipment uses any bandwidth.

To effectively transmit the SCH which is important for initial cell search of the user equipment, it is preferable that a transmitting side allocates more transmission power to the SCH than that of other channels, thereby increasing detection probability of a receiving side. However, if a limited power resource is first allocated to a specific channel, it may affect allocation of transmission power resources of other channels.

DISCLOSURE OF THE INVENTION

Accordingly, the present invention is directed to a method for effectively transmitting a synchronization channel (SCH) and a method for allocating a transmission power for the same, which substantially obviate one or more problems due to limitations and disadvantages of the related art.

An object of the present invention is to provide a method for effectively transmitting a synchronization channel (SCH) and a method for allocating transmission power for the same, which increase a transmission power of a synchronization channel (SCH) while minimizing an influence on other channels.

To achieve these objects and other advantages and in accordance with the purpose of the invention, as embodied and broadly described herein, a method for transmitting a synchronization channel (SCH) includes increasing a transmission power of the SCH by a predetermined amount, and transmitting the SCH of which transmission power is increased, wherein the transmission power is not allocated to a predetermined frequency band within OFDM symbols which includes the SCH, so as to obtain a transmission power corresponding to the increased transmission power of the SCH.

In this case, the predetermined frequency band to which the transmission power is not allocated is distributively located in a unit of one or more sub-carriers. The predetermined frequency band to which the transmission power is not allocated may be located in successive sub-carrier regions. Also, the predetermined frequency band to which the transmission power is not allocated may be located in a sub-carrier region adjacent to the frequency band where the SCH is located.

Furthermore, the predetermined frequency band to which the transmission power is not allocated is previously determined. The predetermined frequency band to which the transmission power is not allocated may variably be determined by a transmitting side of the SCH. In this case, the transmitting side previously transfers position information of the predetermined frequency band to a receiving side.

Furthermore, the SCH may include a plurality of channels which exist within one OFDM symbols, the step of increasing the transmission power of the SCH includes increasing a transmission power of each of the plurality of synchronization channels, and within the one OFDM symbol which includes the plurality of synchronization channels, a transmission power may not be allocated to a predetermined frequency band to obtain a transmission power corresponding to the increased transmission power of the plurality of synchronization channels.

Furthermore, the SCH may include a plurality of channels in a unit of OFDM symbols, the step of increasing the transmission power of the SCH includes increasing a transmission power of each of the plurality of synchronization channels per OFDM symbol, and within each OFDM symbol which includes the plurality of synchronization channels, a transmission power may not be allocated to a predetermined frequency band to obtain a transmission power corresponding to the increased transmission power of the plurality of synchronization channels per OFDM symbol.

In another aspect of the present invention, a method for allocating a transmission power includes allocating a transmission power of the SCH by increasing the transmission power as much as a predetermined amount, and within OFDM symbols which include the SCH, not allocating a transmission power to a predetermined frequency band to obtain a transmission power corresponding to the increased transmission power of the SCH.

According to the preferred embodiment of the present invention, a method for effectively allocating a transmission power and a method for transmitting SCH are provided to minimize an influence on transmission of other channels within one OFDM symbol. In this case, the transmission power of the SCH, which is important for initial cell search of the user equipment, is increased but is not allocated to a predetermined frequency region within the one OFDM symbol to obtain the increased transmission power.

In addition, the position of the region to which the transmission power is not allocated can be set variously to match other matters of a communication system.

BEST MODE FOR CARRYING OUT THE INVENTION

Figure 1:
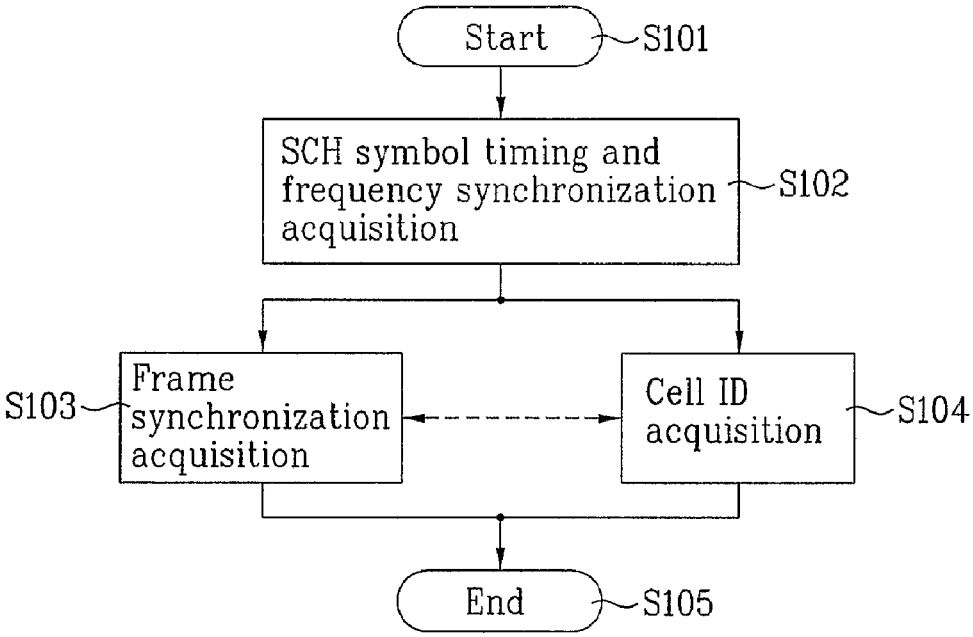
FIG. 1 is a flow chart illustrating a method for performing initial cell search by using a synchronization channel (SCH)
Figure 2:
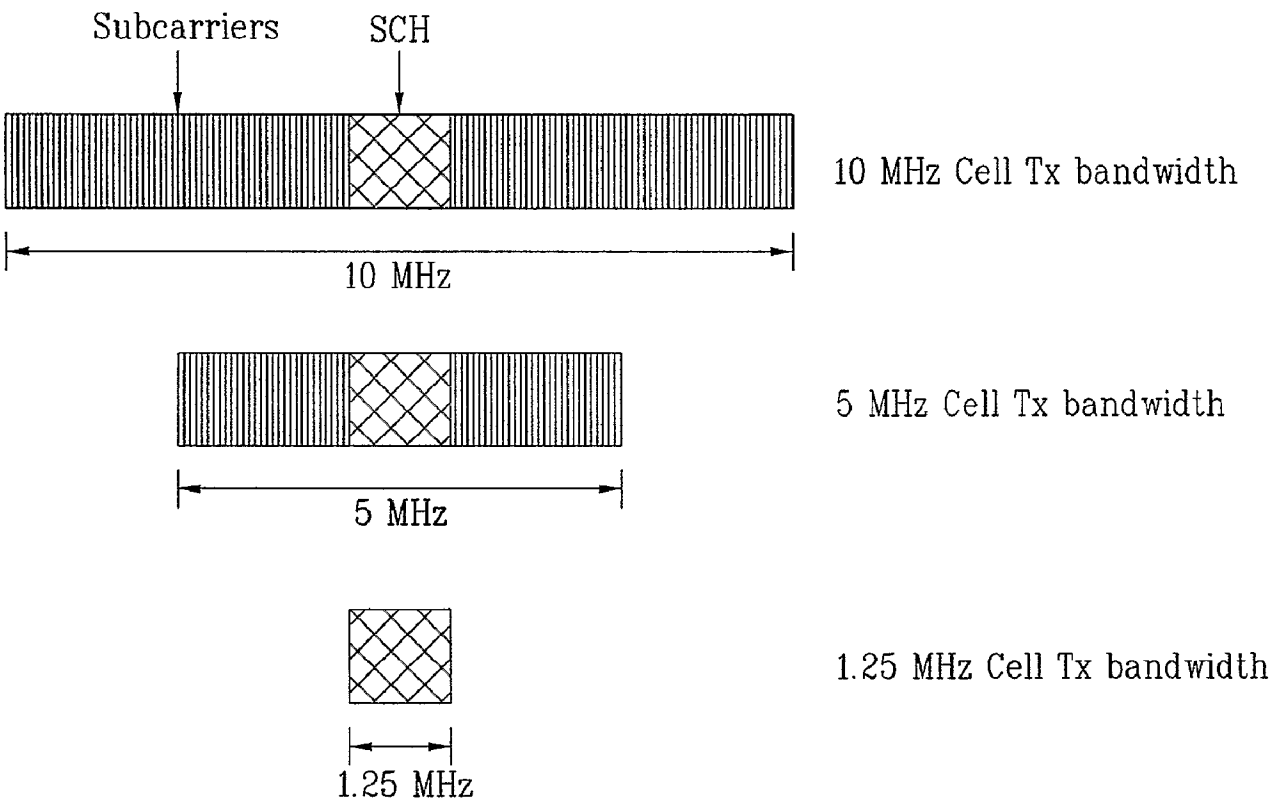
FIG. 2 illustrates a bandwidth where SCH is located in a scalable bandwidth.

Hereinafter, the preferred embodiments of the present invention will be described in detail with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

Hereinafter, the detailed description includes detailed matters to provide full understanding of the present invention. However, it will be apparent to those skilled in the art that the present invention can be carried out without the detailed matters. To prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Meanwhile, for convenience of description, although an example of 3GPP LTE system will be described in the detailed description of the present invention, it will be apparent to those skilled in the art that the present invention is intended to use a synchronization channel (SCH) for synchronization acquisition of a user equipment (UE) and can be applied to a random OFDM communication system of which available transmission power is limited within a specific time.

Hereinafter, to describe a method for transmitting SCH and method for allocating a transmission power for the same in accordance with the preferred embodiments of the present invention, first of all, a general OFDM system will be described.

The basic principle of OFDM is to divide a data stream having a high data transmission rate by a plurality of data streams having a low data transmission rate and simultaneously transmit the data streams by using a plurality of carriers. In this case, each of the plurality of carriers is referred to as a sub-carrier.

Meanwhile, since orthogonality exists among the plurality of carriers of the OFDM, a receiving side can detect frequency components of the carriers even if the respective frequency components are overlapped with each other in the OFDM system.

A method for sequentially transmitting signals in the OFDM system will be described below.

In other words, the data stream having a high data transmission rate is converted into a plurality of data streams having a low data transmission rate through a serial to parallel converter. The converted data streams are multiplied by each of the sub-carriers, and the respective data streams are added to each other, whereby the resultant data streams are transmitted to the receiving side. The plurality of parallel data streams generated by the serial to parallel converter can be transmitted with a plurality of sub-carriers by inverse discrete fourier transform (IDFT). The IDFT can be implemented efficiently using inverse fast fourier transform (IFFT).

Since a symbol duration of a sub-carrier mapped with data streams having a lower data transmission rate than that of a data stream having a higher data transmission rate increases in the aforementioned OFDM system, it is advantageous in that temporally relative signal dispersion generated by multi-path delay spread is reduced.

The general communication system including the aforementioned OFDM system has limitation in a transmission power available for signal transmission in a specific time. In particular, if a transmission power of a sub-carrier to which the SCH is transmitted increases in the aforementioned OFDM system in order to increase a detection probability of the SCH within one OFDM symbol, a transmission power resource of the sub-carrier to which channels other than the SCH are transmitted within the same OFDM symbol may be insufficient. Since the transmission power available for one OFDM transmission is limited, the OFDM system may cause a problem unlike the other communication system.

Accordingly, according to the preferred embodiment of the present invention, there is suggested a method for increasing a transmission power of SCH but making some of a sub-carrier band, to which channels other than the SCH within the same OFDM symbol are transmitted, null without allocating a transmission power thereto. This method according to the preferred embodiment of the present invention will be described below.

Two types of methods may be considered as a method for allocating a transmission power of SCH within OFDM symbol to which the SCH is transmitted, wherein the transmission power of the SCH is higher than that of other channels within the same OFDM symbol.

The first method is to set a transmission power of a corresponding sub-carrier region to 0 and allocate a remaining power resource to the SCH without transmitting other channels to the sub-carrier region corresponding to a frequency region required in the channels other than the SCH. Also, the second method is to reduce the power of channels other than the SCH and thus allocate a remaining power resource to the SCH.

To describe the first method in more detail, when SCH bandwidth of 1.25 MHz exists within a system bandwidth of 10 MHz of the 3GPP LTE system, a case where an average power of a corresponding SCH is higher than an average power of 10 MHz as much as 3 dB will be described.

In the 3GPP LTE system, it is considered that the number of sub-carriers of 10 MHz is approximately 601 and the number of sub-carriers of 1.25 MHz is approximately 76, and it is assumed that the same transmission power of 1 Watt (i.e., an average transmission power of 10 MHz is 1 Watt) is allocated to all sub-carriers.

Under the circumstances, among a total of 601 sub-carriers, if a transmission power is not allocated to 76 sub-carriers allocated to the SCH but the corresponding power is allocated to the SCH, 76 Watt (basic power of 76 sub-carriers for SCH transmission)+76 Watt (available power as a power is not allocated to 76 sub-carriers other than SCH as described above)=152 Watt can be allocated to the SCH which uses 76 sub-carriers. Accordingly, the SCH can have an average transmission power of 152 (Watt)/76=2 Watt so as to obtain an average power higher than 1 Watt twice (i.e., 3 dB), wherein 1 Watt is an average power of a system bandwidth of 10 MHz.

Meanwhile, the second method will be described with reference to the example of the first method. To increase a transmission power of 76 sub-carriers allocated to the SCH among a total of 601 sub-carriers within a bandwidth of 10 MHz as much as 3 dB, a transmission power of 525 sub-carriers except 76 sub-carriers allocated to the SCH is reduced uniformly and allocated to the SCH.

In other words, if a transmission power of 1 Watt is allocated to each of 76 sub-carriers for SCH transmission (a total of 76 Watt), a transmission power of 525 sub-carriers except 76 sub-carriers allocated to the SCH is reduced by 76/525 Watt=about 0.1448 Watt, so as to additionally allocate 76 Watt. As a result, 76 Watt (basic power of 76 sub-carriers for SCH transmission) 76 Watt (power obtained by reducing a transmission power by about 0.1448 Watt from 525 sub-carriers to which the SCH is not allocated)=about 152 Watt can be allocated as the transmission power of 76 sub-carriers for SCH transmission. Accordingly, the SCH can have an average power of 152/76 Watt=about 2 Watt so as to obtain an average power higher than an average power of 1 Watt in a system bandwidth of 10 MHz twice (i.e., 3 dB).

The aforementioned second method may have several problems.

In other words, if channels other than the SCH are modulated through 16 QAM (or 64 QAM), a general receiving side measures an average receiving amplitude of the received 16 QAM (or 64 QAM) symbols to estimate an actual constellation of each of the received QAM symbols by using the average receiving amplitude as a reference value.

At this time, if a transmission power of channels (for example, data channel) other than the SCH, which are transmitted through OFDM symbols to which the SCH is transmitted, is reduced greatly in the same manner as the aforementioned second method, great difference in a transmission power of a data channel occurs between OFDM symbols to which the SCH is transmitted and OFDM symbols to which the SCH is not transmitted. In this case, the receiving side should separately measure an average receiving amplitude of QAM symbols with respect to QAM signals received through the OFDM symbols to which the SCH is transmitted and QAM signals received through the OFDM symbols to which the SCH is not transmitted and use the measured average receiving amplitude for QAM symbol demodulation. Since this action reduces the number of OFDM symbols which can take an average to estimate receiving amplitude, QAM receiving performance of the receiving side may be deteriorated greatly.

Therefore, in the preferred embodiment of the present invention, when a high transmission power is allocated to the SCH, in the same manner as the first method, there is suggested a method for allocating a remaining power resource to the SCH without allocating a transmission power to a corresponding sub-carrier region and transmitting another channel to a frequency region required for channels other than the SCH within OFDM symbols to which the SCH is transmitted. Meanwhile, according to the preferred embodiment of the present invention as described above, the position of a frequency region (hereinafter, referred to as 'null') to which a transmission power is not allocated to obtain a transmission power to be additionally allocated to the SCH may be distributed within the entire system bandwidth or may be localized in a successive sub-carrier region. Also, if the null is distributed, the respective regions may be distributed in a unit of sub-carriers, or several sub-carriers may be designated in blocks to distribute the respective regions in a block unit. Also, combination of the above methods may be used.

Figure 3A:
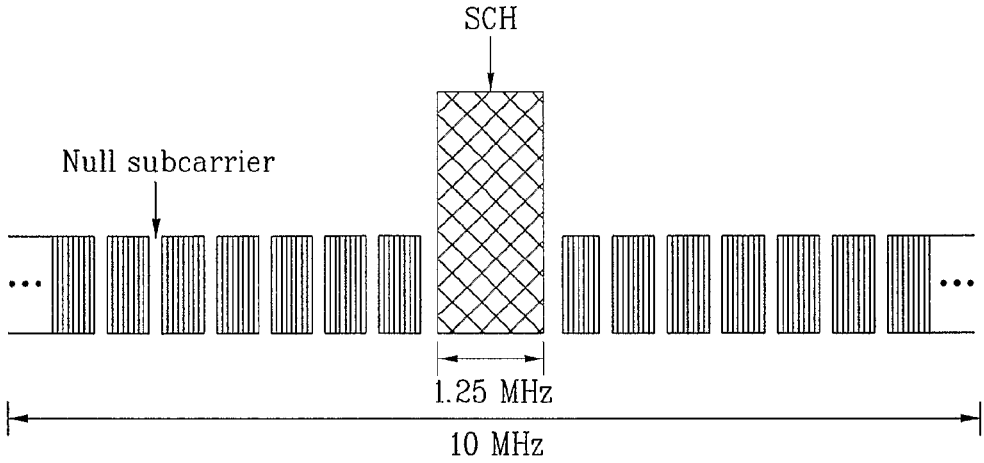
FIG. 3A to FIG. 3C illustrate various methods for distributively locating a frequency band to which a transmission power is not allocated, in accordance with the preferred embodiment of the present invention.
Figure 3B:
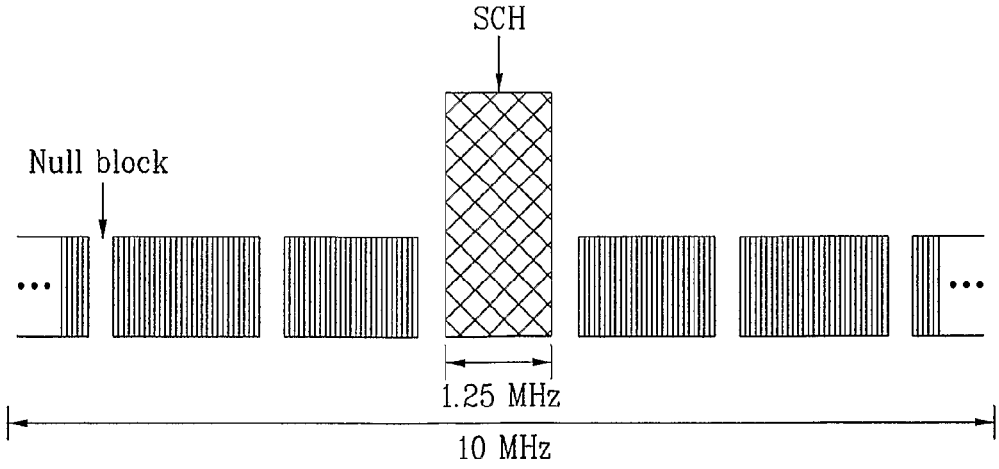
Figure 3C:
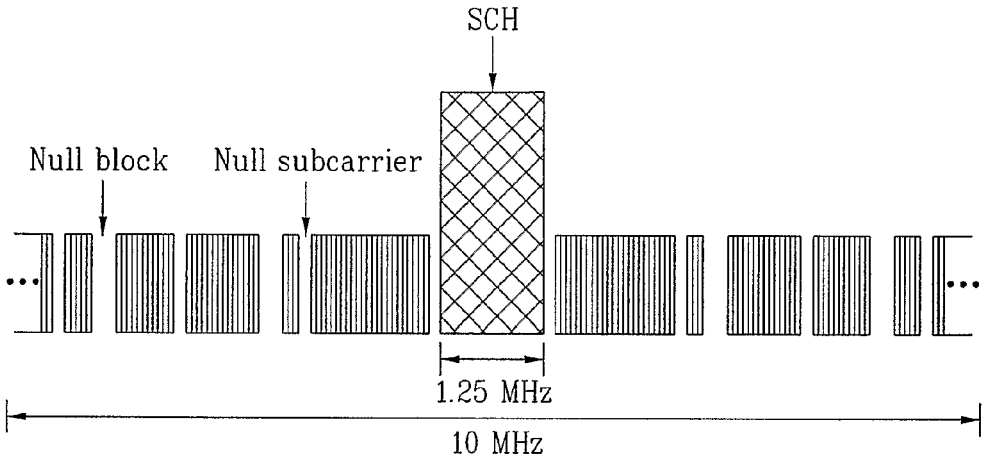

FIG. 3A to FIG. 3C illustrate various methods for distributively locating a frequency band (null) to which a transmission power is not allocated, in accordance with the preferred embodiment of the present invention.

Specifically, FIG. 3A to FIG. 3C illustrates various examples of a method for distributively allocating possible mapping and null band of the SCH having a bandwidth of 1.25 MHz in the 3GPP LTE system having a system bandwidth of 10 MHz. Also, referring to FIG. 3A to FIG. 3C, the SCH is located at the center of a system band. FIG. 3A illustrates an example of a null distributed in a sub-carrier level, and FIG. 3B illustrates an example of a null distributed in a block unit of several sub-carriers set in a block. FIG. 3C illustrates an example of combination of a method for distributing a null in a sub-carrier unit and a method for distributing a null in a group unit of several subcarrriers.

Although FIG. 3A to FIG. 3C illustrate examples that null sub-carriers and/or null blocks are arranged at constant intervals, the null sub-carriers and/or null blocks may be arranged at uneven intervals.

Figure 4:
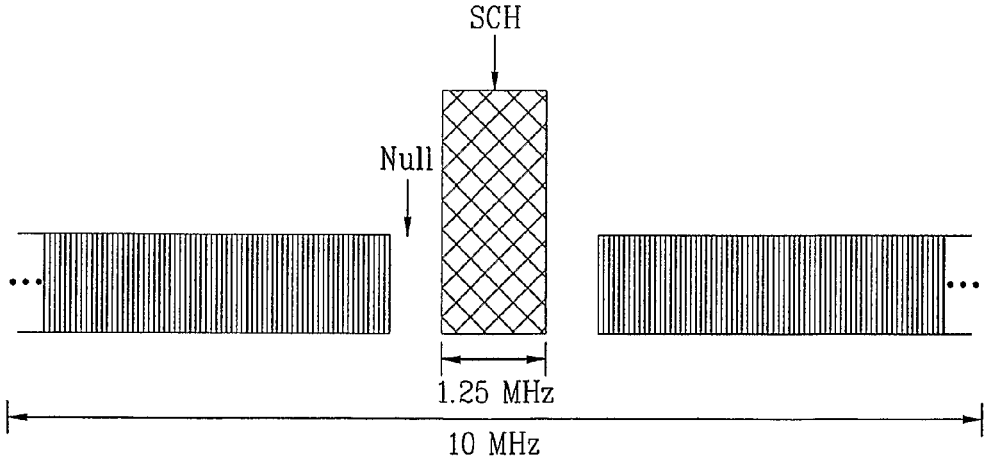
FIG. 4 illustrates a method for setting up a frequency band to which a transmission power is not allocated as a sub-carrier region adjacent to SCH, in accordance with the preferred embodiment of the present invention.

Meanwhile, FIG. 4 illustrates a method for setting up a frequency band, to which a transmission power is not allocated, as a sub-carrier region adjacent to SCH in accordance with the preferred embodiment of the present invention.

In general, when a user equipment (UE) sets up initial communication with a base station, the user equipment uses a band limited filter suitable for a transmission band of the SCH to receive the SCH. For example, in the example of FIG. 4, the user equipment receives the SCH among receiving signals by using a band limited filter of 1.25 MHz. At this time, if a value of sub-carriers adjacent to the SCH is within a corresponding band due to limitation in performance of the band limited filter, the value can act as interference in receiving the SCH.

Therefore, in the preferred embodiment of the present invention, there is suggested a method for greatly relaxing filter requirements in a receiving side by locating a null in a sub-carrier region adjacent to the SCH as shown in FIG. 4. This method may correspond to an application example of the methods illustrated in FIG. 3A to FIG. 3C.

Meanwhile, according to the preferred embodiment of the present invention, the null region is not distributively allocated as shown in FIG. 3A to FIG. 4 but may be locally allocated, which will be described below.

Figure 5:
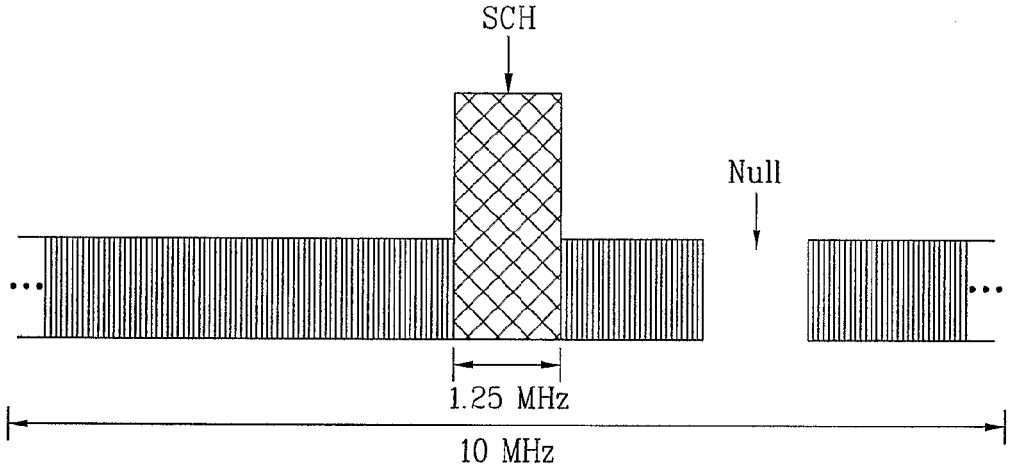
FIG. 5 illustrates a method for locally locating a frequency band to which a transmission power is not allocated, in accordance with the preferred embodiment of the present invention.

FIG. 5 illustrates a method for locally locating a frequency band to which a transmission power is not allocated, in accordance with the preferred embodiment of the present invention.

Specifically, in the method according to the preferred embodiment of the present invention as shown in FIG. 5, a null region which sets a transmission power of corresponding successive sub-carriers to 0 is set without transmitting other channels to a frequency region required for channels other than the SCH, so as to allocate a remaining power resource to the SCH.

Unlike the case where the null region is ditributively allocated, the case where the null region is locally allocated can be used with scheduling of a transmitting side in such a manner as setting a specific frequency band as a null region if the specific frequency band has a poor channel status.

Meanwhile, a communication setup status that the user equipment receives the SCH to perform initial communication access to a base station of a cell to which the user equipment belongs occurs when the user equipment performs handover to another cell as well as when the user equipment performs initial cell search within one cell. In other words, the user equipment receives SCH of a target cell during handover to perform a communication setup procedure of the target cell with the base station. Under this handover status, one or more SCHs can be used considering handover between cells which use different system bandwidths.

Figure 6:
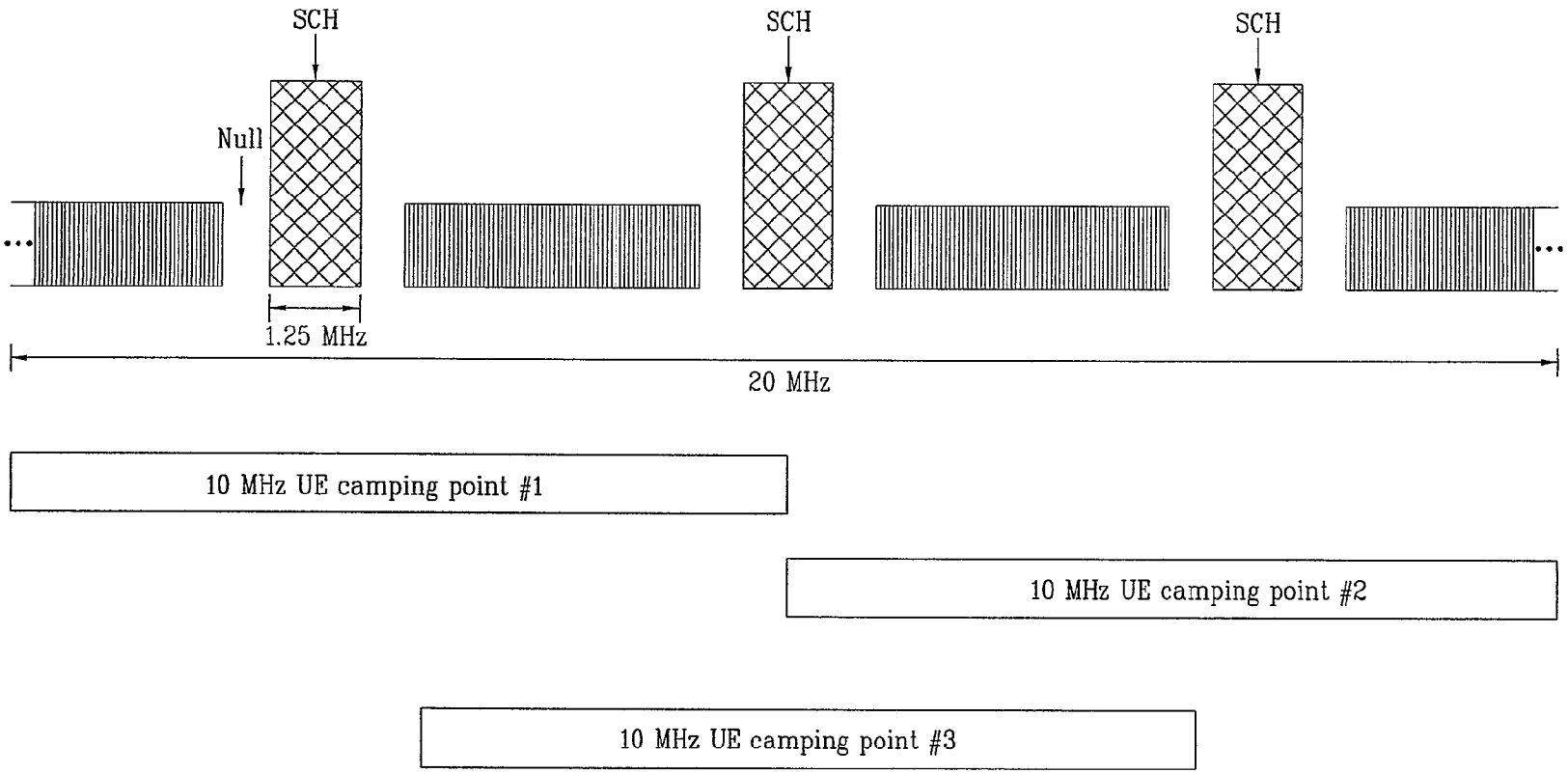
FIG. 6 illustrates a method for allocating a transmission power if a plurality of SCHs are included within one OFDM symbol, in accordance with the preferred embodiment of the present invention.

FIG. 6 illustrates a method for allocating a transmission power if a plurality of SCHs are included within one OFDM symbol in accordance with the preferred embodiment of the present invention.

In other words, FIG. 6 illustrates a design for receiving SCH when a user equipment having receiving performance of a band of 10 MHz in the 3GPP LTE system tries handover for a cell having bandwidth of 20 MHz. In this case, in FIG. 6, three SCHs are used so that the user equipment having receiving performance of 10 MHz receives one or more SCHs no matter what a receiving band of the user equipment is located in any of a system bandwidth of 20 MHz.

Under the circumstances that several SCHs are used as shown in FIG. 6, in the preferred embodiment of the present invention, a frequency region required for channels other than the SCH is set to a null region without allocation of a transmission power, so that a remaining power resource is allocated to the SCH. In this case, the null region may be distributively allocated as described with reference to FIG. 3A to FIG. 3C, or may be set in a sub-carrier region adjacent to the SCH as shown in FIG. 4. Also, the null region may be locally allocated in a specific region as shown in FIG. 5. Moreover, in FIG. 6, a sub-carrier region adjacent to each of several SCHs is set to a null region by using the method shown in FIG. 4.

Meanwhile, in the 3GPP LTE system, a plurality of SCHs may be used depending on their function. Also, a plurality of SCHs may be used within one frame depending on SCH detection and information to be transmitted through the SCH. In this case, an application example of the method according to the preferred embodiment of the present invention will be described below.

Figure 7A:
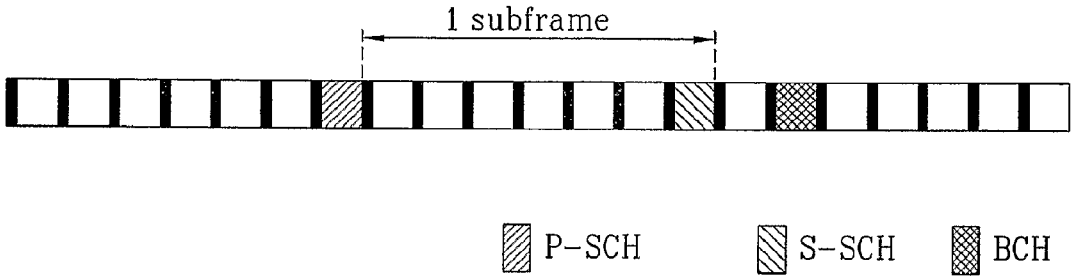
FIG. 7A and FIG. 7B illustrate examples of a method for transmitting SCH in accordance with the preferred embodiment of the present invention if a plurality of SCHs are transmitted through a plurality of OFDM symbols.
Figure 7B:
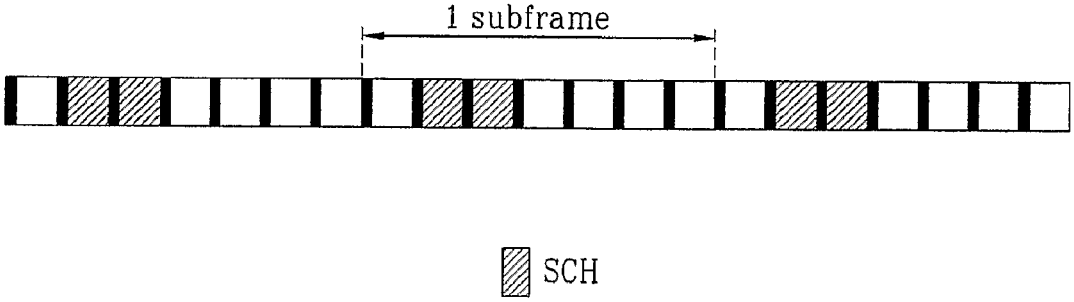

FIG. 7A and FIG. 7B illustrate examples of a method for transmitting SCH in accordance with the preferred embodiment of the present invention if a plurality of SCHs are transmitted through a plurality of OFDM symbols.

Specifically, referring to FIG. 7A, SCH is divided into P-SCH and S-SCH depending on its function, and the P-SCH and the S-SCH are allocated to one or more OFDM symbols along with BCH in a TDM mode.

Meanwhile, FIG. 7B illustrates a case where a plurality of SCHs are transmitted into one sub-frame which includes OFDM symbols. In the 3GPP LTE system which is currently being discussed, it is considered that one, two, or four SCHs may exist within one frame considering SCH detection and information (for example, cell ID) transmitted through SCH as described above. Specifically, FIG. 7B illustrates a case where two SCHs are included in one sub-frame.

Under the circumstances that several SCHs (or P-SCH and/or S-SCH) are transmitted in OFDM symbol unit depending on requirements of a communication system, according to the preferred embodiment of the present invention, there is suggested a method for making a transmission power of a corresponding sub-carrier and/or sub-carrier block null to a value of 0 and allocating a remaining power resource to the SCH without transmitting another channel to a frequency region required for channels other than the SCH within each of the OFDM symbols to which the SCH is transmitted. In this case, the null region may be arranged by distributive allocation, local allocation, or combination of distributive allocation and local allocation as described above. Also, the null region may be set to a region adjacent to the SCH.

Meanwhile, in the method for transmitting SCH and the method for allocating a transmission power in accordance with the preferred embodiment of the present invention, a method for reporting the position of the null region to the receiving side will be described below.

According to the preferred embodiment of the present invention, some of sub-carriers of specific OFDM symbols are allocated to the SCH and the null region, and may be used as a channel for another purpose in other regions. In this case, it is preferable that the user equipment which receives channels other than the SCH within OFDM symbols to which the SCH is transmitted knows which region of the symbols has been used as the null region.

Therefore, the preferred embodiment of the present invention suggests a method for identifying a position of a null region in the user equipment within OFDM symbols without acquisition of additional information as the position of the null region is fixed, and a method for variably setting the position of the null region in the transmitting side and reporting the set position of the null region to the user equipment through separate signaling.

Specifically, in the method for identifying the position of the null region in the user equipment without additional information as the position of the null region is fixed, the system previously sets the position of the null region within the OFDM symbols to which the SCH is transmitted, as a distributively allocated pattern as shown in FIG. 3A to FIG. 3C, a region adjacent to the SCH as shown in FIG. 4, and a locally allocated pattern as shown in FIG. 5. Thus, the transmitting side transmits the SCH by allocating a power while the receiving side (user equipment) knows the position of the null region without additional signaling. In this case, it is advantageous in that signaling overhead for reporting the position of the null region is reduced.

Furthermore, the transmitting side may variably set the position of the null region, and the user equipment may transmit signaling for reporting the set position of the null region. In this case, possible patterns which the transmitting side can set as the position of the null region are previously set as shown in FIG. 3A to FIG. 5. Signaling overhead can be reduced by using a more simplified method for signaling whether the SCH is transmitted depending on which one of the above possible patterns. For example, in case of distributive allocation as shown in FIG. 3A to FIG. 3C, the pattern of the null region is previously set as the size (or the number of sub-carriers) of the frequency region used for the null region is set. In this case, signaling can be performed in such a manner that the size (or the number of sub-carriers) of the frequency region required for the null region is only reported depending on a power increase level of the SCH.

Furthermore, if the transmitting side can variably use the null region as above, the null region can be arranged locally in the sub-carrier region having a poor channel depending on the status of the receiving channel in the local allocation manner shown in FIG. 4. At this time, the transmitting side can use the null region in such a manner that the size of the null region is fixed and its position is only varied depending on the status of the receiving channel. And, in the preferred embodiment of this invention, the user equipment may know the position of the null region in the OFDM symbol in which SCH is transmitted by any means mentioned above. And the user equipment may apply this knowledge of the position of the null region not containing data to decoding data.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

According to the preferred embodiment of the present invention, a method for effectively allocating a transmission power and a method for transmitting SCH are provided to minimize an influence on transmission of other channels within one OFDM symbol. In this case, the transmission power of the SCH, which is important for initial cell search of the user equipment, is increased but is not allocated to a predetermined frequency region within the one OFDM symbol to obtain the increased transmission power.

In addition, the position of the region to which the transmission power is not allocated can be set variously to match other matters of a communication system.

What is claimed is:

1. A method for transmitting a synchronization channel (SCH), the method comprising:

increasing a transmission power of the SCH by a predetermined amount; and transmitting the SCH of which transmission power is increased, wherein the transmission power is not allocated to a predetermined frequency band within Orthogonal Frequency Division Multiple (OFDM) symbols which includes the SCH, so as to obtain a transmission power corresponding to the increased transmission power of the SCH.

2. The method of claim 1, wherein the predetermined frequency band to which the transmission power is not allocated is distributively located in a unit of one or more sub-carriers.

3. The method of claim 1, wherein the predetermined frequency band to which the transmission power is not allocated is located in successive sub-carrier regions.

4. The method of claim 1, wherein the predetermined frequency band to which the transmission power is not allocated is located in a sub-carrier region adjacent to the frequency band where the SCH is located.

5. The method of claim 1, wherein the predetermined frequency band to which the transmission power is not allocated is previously determined.

6. The method of claim 1, wherein the predetermined frequency band to which the transmission power is not allocated is variably determined by a transmitting side of the SCH, and the transmitting side previously transfers position information of the predetermined frequency band to a receiving side.

7. The method of claim 1, wherein the SCH includes a plurality of channels which exist within one OFDM symbols, the step of increasing the transmission power of the SCH includes increasing a transmission power of each of the plurality of synchronization channels, and within the one OFDM symbol which includes the plurality of synchronization channels, a transmission power is not allocated to a predetermined frequency band to obtain a transmission power corresponding to the increased transmission power of the plurality of synchronization channels.

8. The method of claim 1, wherein the SCH includes a plurality of channels in a unit of OFDM symbols, the step of increasing the transmission power of the SCH includes increasing a transmission power of each of the plurality of synchronization channels per OFDM symbol, and within each OFDM symbol which includes the plurality of synchronization channels, a transmission power is not allocated to a—predetermined frequency band to obtain a transmission power corresponding to the increased transmission power of the plurality of synchronization channels per OFDM symbol.

9. A method for allocating a transmission power, the method comprising:

allocating a transmission power of the synchronization channel (SCH) by increasing the transmission power as much as a predetermined amount; and within Orthogonal Frequency Division Multiple (OFDM) symbols which include the SCH, not allocating a transmission power to a predetermined frequency band to obtain a transmission power corresponding to the increased transmission power of the SCH.

* * * * *